United States Patent
Hoffmann

(10) Patent No.: US 10,904,759 B2
(45) Date of Patent: Jan. 26, 2021

(54) METHOD FOR STARTING UP AND PERSONALIZING A SUBSCRIBER IDENTITY MODULE

(71) Applicant: GIESECKE+DEVRIENT MOBILE SECURITY GMBH, Munich (DE)

(72) Inventor: Lars Hoffmann, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/635,845

(22) PCT Filed: Aug. 16, 2018

(86) PCT No.: PCT/EP2018/000402
§ 371 (c)(1),
(2) Date: Jan. 31, 2020

(87) PCT Pub. No.: WO2019/034282
PCT Pub. Date: Feb. 21, 2019

(65) Prior Publication Data
US 2020/0228983 A1    Jul. 16, 2020

(30) Foreign Application Priority Data
Aug. 17, 2017   (DE) ......................... 10 2017 007 790

(51) Int. Cl.
*H04W 12/04*   (2009.01)
*H04W 12/06*   (2009.01)
(Continued)

(52) U.S. Cl.
CPC ....... *H04W 12/0609* (2019.01); *H04W 8/205* (2013.01); *H04W 8/245* (2013.01);
(Continued)

(58) Field of Classification Search
CPC . H04W 12/0023; H04W 12/04; H04W 12/06; H04W 8/18; H04W 8/265;
(Continued)

(56) References Cited

U.S. PATENT DOCUMENTS

| | | |
|---|---|---|
| 7,023,994 B1 | 4/2006 | Dupré |
| 7,266,371 B1 | 9/2007 | Amin et al. |

(Continued)

FOREIGN PATENT DOCUMENTS

| | | |
|---|---|---|
| EP | 2536186 A1 | 12/2012 |
| EP | 2283666 B1 | 3/2015 |
| WO | 2009141035 A1 | 11/2009 |

OTHER PUBLICATIONS

German Examination Report from DE Application No. 102017007790.8, dated Jul. 5, 2018.

(Continued)

*Primary Examiner* — Jean A Gelin
(74) *Attorney, Agent, or Firm* — Workman Nydegger

(57) ABSTRACT

A method for the initial operation and personalization of a subscriber identity module in a mobile radio network, prior to its first initial operation in the mobile radio network, the subscriber identity module does not yet include an individual secret key and is being equipped with an individual, unique parameter data set only after its first initial operation in the mobile radio network. A mobile radio server takes on, from the subscriber identity module, an authentication message formed with a preliminary parameter data set comprising an individual, unique subscriber identification and a non-individual, non-unique preliminary secret key, and sends, after a verification, in response thereto an individual, unique final secret key to the subscriber identity module for programming into the subscriber identity module. The preliminary parameter data set is introduced into the subscriber (Continued)

identity module selectively during production or by an initializing step based on an initial parameter data set.

14 Claims, 2 Drawing Sheets

(51) Int. Cl.
| | | |
|---|---|---|
| *H04W 12/00* | (2009.01) | |
| *H04W 8/20* | (2009.01) | |
| *H04W 8/24* | (2009.01) | |
| *H04W 8/26* | (2009.01) | |

(52) U.S. Cl.
CPC ......... *H04W 8/265* (2013.01); *H04W 12/004* (2019.01); *H04W 12/00514* (2019.01); *H04W 12/04* (2013.01)

(58) Field of Classification Search
CPC .. H04W 12/08; H04W 12/10; H04L 2209/56; H04L 9/321; H04L 9/3273
See application file for complete search history.

(56) References Cited

U.S. PATENT DOCUMENTS

| | | | |
|---|---|---|---|
| 8,571,537 B2 | 10/2013 | Kaliner | |
| 10,425,821 B2 * | 9/2019 | Yang | G06Q 20/32 |
| 2007/0050618 A1 * | 3/2007 | Roux | H04L 9/3231 |
| | | | 713/155 |
| 2009/0228719 A1 * | 9/2009 | Almgren | H04W 12/0013 |
| | | | 713/193 |
| 2011/0059773 A1 * | 3/2011 | Neumann | H04W 8/205 |
| | | | 455/558 |
| 2011/0136482 A1 * | 6/2011 | Kaliner | H04W 8/265 |
| | | | 455/418 |
| 2012/0263298 A1 * | 10/2012 | Suh | H04W 4/50 |
| | | | 380/255 |
| 2015/0181024 A1 | 6/2015 | El Mghazli et al. | |
| 2015/0289140 A1 * | 10/2015 | Rudolph | H04W 8/205 |
| | | | 455/411 |
| 2016/0174069 A1 | 6/2016 | Bruner et al. | |
| 2016/0180343 A1 * | 6/2016 | Poon | G06Q 20/20 |
| | | | 705/75 |

OTHER PUBLICATIONS

International Search Report & Written Opinion from PCT Application No. PCT/EP2018/000402, dated Nov. 15, 2018.

* cited by examiner

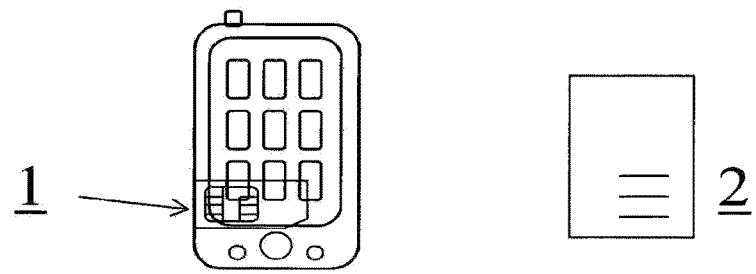
Fig. 1
| parameter data set | IMSI | Ki | usable |
|---|---|---|---|
| (S1) initial | non-individual | non-individual | retrieve IMSI-individual |
| (S2) preliminary | individual | non-individual | retrieve Ki-individual |
| (S3) final | individual | individual | permanent use |
Fig. 2
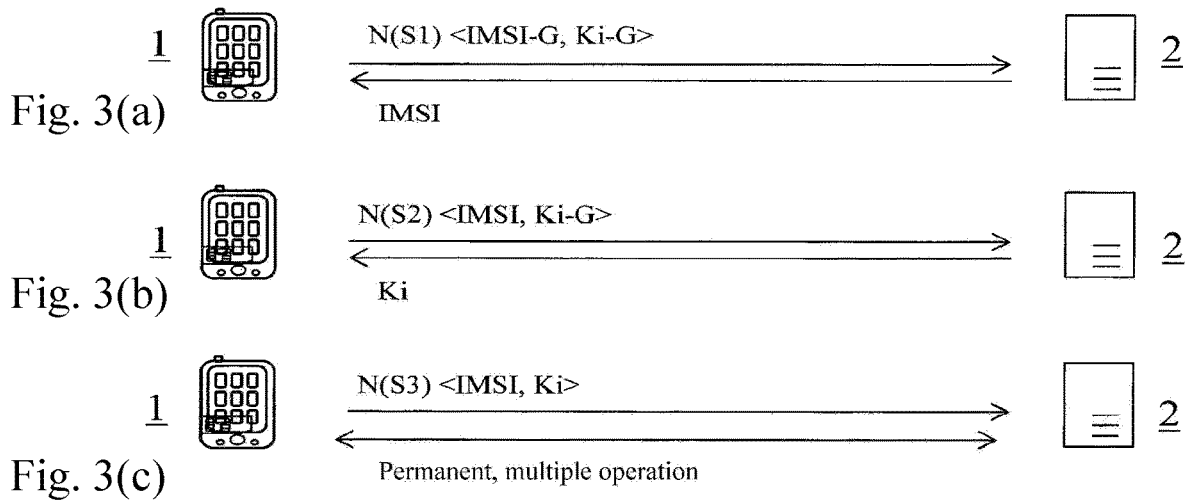

| Ki-G1 | 1-IMSI-G | 1-IMSI |
| Ki-G2 | 2-IMSI-G | 2-IMSI |
| Ki-G3 | 3-IMSI-G | 3-IMSI |
| ... | | |

METHOD FOR STARTING UP AND PERSONALIZING A SUBSCRIBER IDENTITY MODULE

FIELD OF THE INVENTION

The invention relates to a method for the initial operation and personalization of a subscriber identity module in a mobile radio network, in which, prior to its first initial operation in the mobile radio network, the subscriber identity module does not yet include an individual, unique parameter data set comprising at least an individual subscriber identification and an individual secret key, and is being equipped with an individual, unique parameter data set of final identification and authentication parameters only after its first initial operation in the mobile radio network.

BACKGROUND ART

The world is interconnected by a mobile network, and the mobile networking continues to progress. Mobile radio-enabled end devices communicate via mobile radio networks. Smartphones and mobile phones are classic mobile radio-enabled devices—or equivalently mobile radio end devices. Mobile radio-enabled end devices further include regulation devices (control devices or measuring devices or combined control/measuring devices) for industrial apparatuses in a commercial or private environment. Industrial apparatuses are, for example, production facilities that have one or more regulation devices (end devices) which can communicate with a background system and/or one another via a mobile radio network. Further industrial apparatuses are smart home apparatuses such as e.g. heating systems or current consumers with end devices in the form of regulation devices.

For utilizing a mobile radio-enabled end device, such as a smartphone or mobile phone, in a mobile radio network of a network operator, the end device includes a subscriber identity module with a subscription profile, or profile for short. The profile effects the configuration of the end device and the connection of the end device in the mobile radio network. The profile comprises an individual parameter data set, which enables the establishment, operation and clearing of a connection of the end device in the mobile radio network, and comprises for example a cryptographic authentication key—also referred to as a secret key—Ki and an individual international mobile subscriber identity—IMSI.

The subscriber identity module may have different form factors, in particular plug-in, embedded, integrated and software. Subscriber identity modules of the form factor plug-in and embedded are disposed on a dedicated, distinct chip or SoC (System on Chip). Examples of plug-ins are SIM card (SIM=Subscriber Identity Module) or USIM card (Universal SIM) or UICC (Universal Integrated Circuit Card).

The infrastructure of a mobile radio network operator comprises a multiplicity of servers, hereinafter generally referred to as mobile radio servers. The mobile radio servers in terms of functionality comprise production servers which are used during the production of subscriber identity modules, e.g. personalization servers and other production servers, to personalize subscriber identity modules during production. Such production servers (also personalization servers) can be under the management of a different party, e.g. a SIM card manufacturer. The mobile radio servers further comprise operational and provisioning servers that are used when a subscriber identity module is already deployed in the field at a customer, e.g. an end customer or user of a mobile radio end device (e.g. smartphones). Operational servers are used, for example, for the normal operation such as e.g. telephone calls. Provisioning servers are used to send data into subscriber identity modules that are already in the field, for example for the first initial operation of a subscriber identity module, or also later.

In a known method for the personalization of a subscriber identity module, an individual parameter data set, comprising in particular an individual subscriber identification IMSI and an individual cryptographic secret key (authentication key) Ki, is programmed into the subscriber identity module by a personalization server already during production of the subscriber identity module. Correctly assigned subscriber identifications IMSI and secret key Ki are registered with the mobile radio server. If, in this system, a subscriber identity module with an unregistered subscriber identification IMSI contacts the mobile radio server, the message is not accepted. For a multiplicity of subscriber identity modules it is necessary that the mobile radio server registers a multiplicity of subscriber identifications IMSI for working up a stock, even when the subscriber identity modules which correspond to the subscriber identifications IMSI are not yet in operation.

The prior art document WO 2009/141035 A1 (with family members EP2283666B1 and U.S. Pat. No. 8,571,537B2) discloses a method for the initial operation and personalization of a subscriber identity module (there referred to as subscriber identification module) in a mobile radio network, in which prior to a first initial operation a multiplicity of subscriber identity modules are furnished with identical, non-individual, non-unique generic, initial parameter data sets of initial identification and authentication parameters which include at least a non-individual and preliminary subscriber identification IMSI and a non-individual and preliminary secret key Ki. According to the solution in WO 2009/141035 A1, a personalization of a subscriber identity module is performed only after or on the occasion of its first initial operation. In doing so, an individual and final subscriber data set is transmitted and stored on the subscriber identity module. This includes a unique final subscriber identification IMSI and the now own individual secret key of the subscriber identity module.

The prior art document U.S. Pat. No. 8,571,537B2 proposes a similar method for the initial operation and personalization of a subscriber identity module as EP2283666B1 from the same patent family. In the solution of U.S. Pat. No. 8,571,537B2 one starts with a multiplicity of subscriber identity modules having identical, non-individual, non-unique, generic, initial parameter data sets.

In the solution of WO 2009/141035 A1, one and the same generic, initial parameter data set is programmed into each subscriber identity module during the production of the subscriber identity modules. In contrast to methods in which an individual parameter data set is programmed into each subscriber identity module already during production, the method of WO 2009/141035 A1 does without continually generating and supplying anew an individual parameter data set upon the programming of an individual subscriber identity module. This allows that the production of the subscriber identity modules can be effected in an accelerated manner.

However, if more or different subscriber identity modules than originally intended are programmed with the non-individual initial parameter data set, then these subscriber identity modules are also equipped with valid initial parameter data sets which may enable them to retrieve final individual parameter data sets. This danger does not exist for subscriber identity modules into which an individual parameter data set is programmed already during production. Subscriber identity modules which are programmed with an individual parameter data set already during production are thus more secure in the described respect at the price of a slower production.

SUMMARY OF THE INVENTION

The invention is based on the object of creating a method for the initial operation and personalization of subscriber identity modules, which enables a production of the subscriber identity modules that is as efficient as possible as well as offers a security as high as possible.

This object is achieved by a method according to claim 1. Advantageous embodiments of the invention are stated in dependent claims.

The method according to claim 1 is arranged for the initial operation and personalization of a subscriber identity module in a mobile radio network. The subscriber identity module does not yet have an individual, unique parameter data set before its initial operation in the mobile radio network. Such an individual, unique parameter data set comprises at least an individual subscriber identification IMSI and an individual secret key Ki. The subscriber identity module is equipped with an individual, unique parameter data set only after or on the occasion of its first initial operation in the mobile radio network (by a customer who has purchased the subscriber identity module). Only the individual, unique parameter data set comprising an individual subscriber identification IMSI and an individual secret key Ki enables a permanent operation of a mobile radio end device, in which the subscriber identity module is operated, in a mobile radio network.

The method is characterized by the following steps:
a) supplying a subscriber identity module which includes a preliminary parameter data set comprising:
a1) a unique subscriber identification individual to the subscriber identity module, and
a2) a non-individual, non-unique preliminary secret key identical for a multiplicity of subscriber identity modules;
b) supplying a mobile radio server which has the non-individual, non-unique preliminary secret key, and, at the mobile radio server, performing the steps of:
b1) taking on, from the subscriber identity module, an authentication message formed with the individual, unique subscriber identification and the non-individual, non-unique preliminary secret key;
b2) in response to taking on the authentication message, verifying the authentication message according to predetermined criteria, and in the case of a successful authentication, sending an individual, unique final secret key to the subscriber identity module for programming into the subscriber identity module.

Compared to subscriber identity modules which are completely personalized with an individual subscriber identification IMSI and an individual secret key Ki already during production, the method has the advantage that upon production one and the same secret key can be programmed into all the subscriber identity modules of a contemplated batch or group, without individual programming of the individual subscriber identity modules with an individual secret key. This allows an accelerated production of the subscriber identity modules. In addition, the management of secret keys is simplified because there is first only one single generic non-individual secret key.

The provision of an individual subscriber identification IMSI in the subscriber identity module before the latter retrieves its own individual secret key from the mobile radio server based on the non-individual secret key moreover prevents an arbitrary duplication of the parameter data set for manufacturing forged or cloned subscriber identity modules. In a parameter data set in which both the subscriber identification IMSI and the secret key are non-individual, a duplication is basically possible. The preliminary parameter data set of the invention thus offers improved protection and security against forging or cloning of subscriber identity modules.

Therefore, according to claim 1, a method for the initial operation and personalization of a subscriber identity module in a mobile radio network is created which both enables a production of the subscriber identity modules as efficient as possible and offers a security as high as possible.

After the individual, unique final secret key has been received at the subscriber identity module, it is programmed into the subscriber identity module to equip the subscriber identity module with the final individual, unique parameter data set. The subscriber identity module is now equipped for the permanent operation in the mobile radio network.

Preferably, the preliminary parameter data set allows an individual secret key to be downloaded into the subscriber identity module by means of the authentication cycle according to step b), but not a permanent operation of the subscriber identity module or of a mobile radio end device equipped with the subscriber identity module in the mobile radio network. Selectively, the preliminary parameter data set allows only one single (successfully and completely performed) authentication cycle according to step b) and is no longer usable afterwards. The authentication cycle according to step b) can selectively consist of the two above-described communication steps b1) and b2) between subscriber identity module and mobile radio server. As described below, the authentication cycle can alternatively consist of four (or more) communication steps between the subscriber identity module and the mobile radio server. In particular, as is also described below, communication step b2) may comprise several communication substeps, and only in the last communication substep the final individual secret key is transmitted to the subscriber identity module.

According to some first embodiments of the invention, the subscriber identity module is programmed with the preliminary parameter data set (individual subscriber identification IMSI, non-individual secret key (e.g. group key)) already during production.

According to some other, in this application also referred to as second, embodiments of the invention, according to claim 3, the subscriber identity module first is programmed with an initial parameter data set (non-individual subscriber identification, non-individual secret key (e.g. group key)). The initial parameter data set is programmed preferably already during production. The preliminary parameter data set (individual subscriber identification IMSI, non-individual secret key (e.g. group key)) is into the subscriber identity module only in a preparatory, singular authentication cycle. In this singular authentication cycle, first only the non-individual subscriber identification is replaced by an individual subscriber identification. Subsequently, in a second singular authentication cycle, there is effected the replacement, according to the invention, of the non-individual secret key (e.g. group key) by the individual secret key.

Preferably, the initial parameter data set enables only one single (successfully completely performed) authentication cycle for the subscriber identity module, in which cycle an individual subscriber identification is downloaded from the mobile radio server into the subscriber identity module. The initial parameter data set allows at least the download of an individual subscriber identification from the mobile radio server into the subscriber identity module but no permanent operation of the subscriber identity module for authentications in the mobile radio network.

A method according to claim 4 for preparing a subscriber identity module for a method according to the invention, in the subscriber identity module there is being arranged, based on an initial, completely non-individual generic parameter data set, a preliminary parameter data set in which the subscriber identification IMSI is already individual but the secret key not yet. Into a subscriber identity module prepared in this way there can be loaded according to the invention, in particular after the preliminary parameter data set has also been registered with the relevant mobile radio server, an individual secret key to completely individualize the subscriber identity module and thus completely personalize it. In particular, in the method for preparing in the subscriber identity module, an individual, unique subscriber identification IMSI received from the mobile radio server and the previously already present, non-individual, non-unique preliminary secret key are combined into a preliminary parameter data set. Preferably, the preliminary parameter data set is additionally registered with a mobile radio server. By means of the preliminary parameter data set, the individual, unique final secret key can be loaded in a subsequent step—according to the invention—from the mobile radio server into the subscriber identity module.

Preferably, the initial parameter data set only enables downloading the individual subscriber identification, and the preliminary parameter data set enables only downloading the individual secret key. Neither the initial parameter data set nor the preliminary parameter data set enables a permanent operation of the subscriber identity module for authentications in the mobile radio network, as performed for example with standard activities such as making telephone calls and mobile data connections in the mobile radio network.

The method selectively further comprises, subsequent to one or several of the steps of receiving according to step b1 and verifying according to step b2 (with the objective of sending the individual secret key Ki), the following step:

at the mobile radio server: registering the individual, unique final secret key (Ki) according to b2) as the final secret key (Ki) associated with the subscriber identity module.

The method selectively further comprises, subsequent to the steps of receiving according to b1 or d1 and positively verifying according to b2 or d2 at the mobile radio server: registering the unique subscriber identification individual to the subscriber identity module as the final unique subscriber identification associated with the subscriber identity module. In particular, it is therefore possible that the mobile radio server registers the individual, unique subscriber identification IMSI only when the subscriber identity module for the first time logs on to the mobile radio network with the individual, unique subscriber identification.

By the registration step or the registration steps it is achieved that the subscriber identity module with its individual parameters subscriber identifier IMSI or/and secret key Ki is listed as a known, registered subscriber identity module. Only subscriber identity modules for which a complete individual final parameter data set is registered with the mobile radio server can permanently participate in communication in the mobile radio network and enable or perform authentications in the mobile radio network.

The non-individual secret key is, by its function, a group key for all subscriber identity modules that include a preliminary or initial parameter data set with the non-individual secret key.

If needed, several group keys may be provided for several groups of subscriber identity modules. In a simple example, all the subscriber identity modules which are associated with the same mobile radio network operator have the same group key. Subscriber identity modules of other network operators have different group keys. In another example, all the subscriber identity modules which are associated with the same mobile radio network operator and here are associated with a particular batch of subscriber identity modules have the same group key. Subscriber identity modules of the same network operator belonging to different batches have different group keys. A batch may comprise for example all the subscriber identity modules that have been produced or put on the market in a certain period of time (e.g. 1 week, 1 month, 1 year, etc.).

More specifically, several groups of subscriber identity modules are supplied, each group comprising a multiplicity of subscriber identity modules. The preliminary parameter data set a) includes as a preliminary secret key a preliminary group key from a number of group keys. Each group has assigned thereto an own group key from the plurality of group keys. The mobile radio server has all the group keys from the plurality of group keys. In this case, the individual, unique subscriber identification according to a1) and, where applicable, the identical, non-individual, non-unique initial subscriber identification according to c1) (respectively) includes a group key information item from which it can be derived with which group key the subscriber identification is associated.

Before the final individual secret key can be sent to the subscriber identity module, an authentication message which the subscriber identity module sends to the mobile radio server is verified at the mobile radio server. Only after positive verification the final individual secret key may be sent to the subscriber identity module.

The step b2) of verifying the authentication message according to predetermined criteria selectively comprises the following substeps performed at the mobile radio server: b2-1) extracting the non-individual, non-unique preliminary secret key from the authentication message; b2-2) verifying the non-individual, non-unique preliminary secret key extracted according to b2-1). If the extracted non-individual, non-unique preliminary secret key cannot be verified to be positive, this secret key is not an authorized secret key of the mobile radio server, and the subscriber identity module is rejected and not further personalized. If the preliminary secret key is verified to be positive, it is an authorized secret key of the mobile radio server and the personalization of the subscriber identity module is continued.

As described above, the final individual secret key can be sent to the subscriber identity module immediately in response to the positive verification of the authentication message. Alternatively, after the extracted non-individual, non-unique preliminary secret key has been verified to be positive in step b2-2), first only the subscriber identification according to feature a1) is considered as the valid subscriber identification and registered with the mobile radio server as the valid subscriber identification. For the final individual secret key to be sent to the subscriber identity module, it is necessary that the subscriber identity module sends a further second authentication message to the mobile radio server and that this further second authentication message is also verified to be positive. Only then does the mobile radio server send the final secret key to the subscriber identity module.

For this purpose, after the subscriber identification evaluated as valid has been registered with the mobile radio server in step b3), a second authentication message, from the subscriber identity module, formed with the individual, unique subscriber identification and the non-individual, non-unique preliminary secret key is taken on at the mobile radio server, according to substep b2-4). According to substep b2-5), in response to taking on the second authentication message, the second authentication message is verified at the mobile radio server according to predetermined criteria, e.g. according to criteria as described for the authentication message. In case of a successful authentication, the mobile radio server sends the individual, unique final secret key to the subscriber identity module. Finally, the secret key is subsequently programmed into the subscriber identity module.

The step b2-5) of verifying the second authentication message according to predetermined criteria selectively comprises the following substeps performed at the mobile radio server:
b2-5-1) extracting the non-individual, non-unique preliminary secret key from the second authentication message;
b2-5-2) verifying the non-individual, non-unique preliminary secret key extracted according to b2-5-1);
b2-5-3) in case the extracted non-individual, non-unique preliminary secret key is verified to be positive in step b2-5-2), sending the individual, unique final secret key (Ki) to the subscriber identity module for programming into the subscriber identity module.

The authentication according to step b2-2) or according to b2-5-2) is selectively performed by means of a challenge-response method. The challenge-response method selectively follows the following scheme:
b2-1) or b2-5-1) extracting the non-individual, non-unique preliminary secret key from the authentication message;
b2-2) or b2-5-2) forming an authentication challenge using the non-unique preliminary secret key and a random information item, in particular random number or pseudo-random number;
b2-2-1) or b2-5-2-1) sending the authentication challenge to the subscriber identity module; b2-2-2) or b2-5-2-2) receiving, from the subscriber identity module, an authentication answer formed at the subscriber identity module using the non-unique preliminary secret key and the random information item;
b2-3) or b2-5-3) verifying the authentication answer.
Further similar challenge-response schemes are known from the prior art.

The method selectively comprises registering, with the mobile radio server, the individual, unique final secret key for the subscriber identity module after the secret key has been assigned to the subscriber identity module or after the secret key has been sent to the subscriber identity module.

The mobile radio server is arranged, according to embodiments of the invention, to perform the verification of the authentication message according to step b2) for each individual, unique subscriber identification taken on in an authentication message according to step b1), in particular without a requirement that the individual, unique subscriber identification is already registered with the mobile radio server.

In other words, the mobile radio server accepts each incoming or at least each unknown subscriber identification (IMSI), optionally except for subscriber identifications that are explicitly prohibited or blocked. Decisive for whether the subscriber identification is accepted by the mobile radio server is the secret key used with the subscriber identification. If the secret key is verified to be positive, the subscriber identification is accepted and registered with the mobile radio server. A pre-registration of already assigned individual subscriber identifications is not required. This reduces the management effort at the mobile radio server compared to servers with pre-registered individual subscriber identifications.

In the context of the invention, a mobile radio server is understood to be a server that is arranged to be able to perform one or several personalization steps on a subscriber identity module. Personalization steps are, for example, sending an individual secret key or/and an individual subscriber identification to a subscriber identity module. In the context of the personalization, an authentication between the mobile radio server and the subscriber identity module may be required.

In the context of the invention, a mobile radio server used in production may be a different mobile radio server than a mobile radio server used to personalize a subscriber identity module already in the field. Nevertheless, in the context of the invention, the mobile radio server is always referred to, corresponding to its function, as the mobile radio server. In production, the mobile radio server can be designed as a classic production personalization server. In the field, i.e. when the subscriber identity module is already in use at a customer (e.g. a retailer customer, or alternatively preferably an end customer or user) in a mobile radio end device, the mobile radio server can be designed as a provisioning server for the remote provisioning of SIMs, e.g. for remote provisioning according to recommendations of the GSMA (GSM Association; GSM=Global System for Mobile Communications).

The mobile radio server can be designed as a single server. Alternatively, the mobile radio server can be structured internally into several servers with different tasks. For example, in the case of a personalization of a subscriber identity module already in use in the field, the "mobile radio server" may comprise a data preparation server (data preparation) that prepares personalization data for transmission to a subscriber identity module, and a secure send server (secure router) that sends prepared personalization data to the subscriber identity module, in accordance with GSMA recommendations for remote provisioning of SIMs.

The initial parameter data set is introduced into the subscriber identity module preferably during the production of the subscriber identity module, by a mobile radio server designed as a personalisation server and located in a production environment.

The preliminary parameter data set can likewise be introduced into the subscriber identity module during production of the subscriber identity module by a personalization server located in a production environment. Alternatively, when an initial parameter data set is used, it is introduced into the subscriber identity module during production. In this case, based on the initial parameter data set, the individual subscriber identification is first introduced into the subscriber identity module and thus the preliminary parameter data set is arranged in the subscriber identity module, when the subscriber identity module is already in the field at a customer in a mobile radio end device. In this case, the preliminary parameter data set is preferably arranged by a provisioning server in the subscriber identity module, e.g. by a GSMA provisioning server, selectively also by a provisioning server comprising data preparation server and secure router for the subtasks data preparation and data transmission to the subscriber identity module.

BRIEF DESCRIPTION OF THE DRAWINGS

Hereinafter the invention will be explained more closely on the basis of embodiment examples and with reference to the drawings, in which are shown:

FIG. 1 a system for illustrating the invention;

FIG. 2 parameter data sets which are used in embodiments of the method according to the invention;

FIGS. 3(a) to 3(c) authentication cycles 3(a), 3(b) and 3(c), for the purpose of 3(a) retrieving an individual IMSI, 3(b) retrieving an individual secret key and 3(c) normal operation in the mobile radio network, by means of authentication messages formed with parameter data sets according to FIG. 2, according to embodiments of the invention;

DETAILED DESCRIPTION OF EMBODIMENT EXAMPLES

Figures 4, 5:
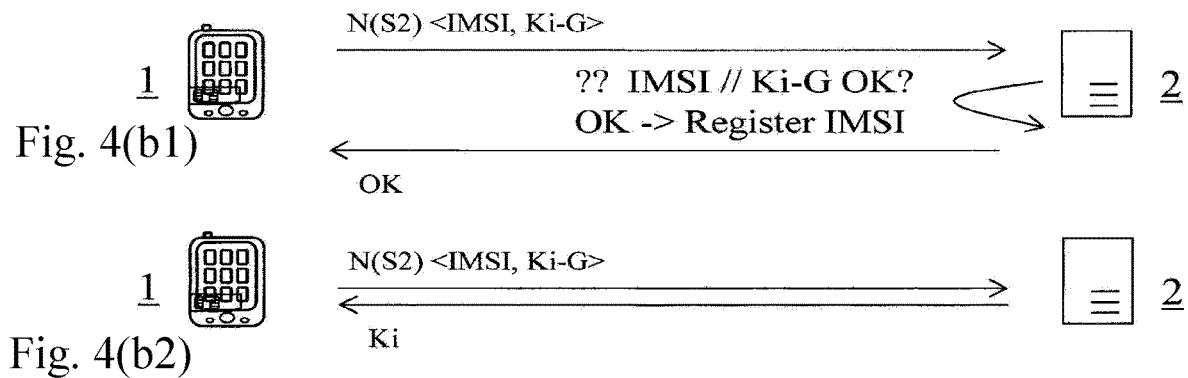
FIGS. 4(b1) and 4(b2) special embodiments of the authentication cycle of FIG. 3(b) with separate authentication steps 4(b1) for registering a still unknown IMSI with the mobile radio server and 4(b2) retrieving the individual secret key.
FIG. 5 a plurality of preliminary secret keys Ki-G1, Ki-G2, Ki-G3 for several groups 1, 2, 3 of subscriber identity modules 1.

FIG. 1 shows a system for illustrating the invention, comprising a subscriber identity module 1 operated in a mobile radio end device, in this case a smartphone, and a mobile radio server 2.

FIG. 2 shows parameter data sets which are used in embodiments of the method according to the invention.

An initial parameter data set S1 in the context of the invention is completely non-individual and comprises a non-individual subscriber identification IMSI-G (group IMSI) and a non-individual secret key Ki-G (group key), which are identical for a multiplicity of subscriber identity modules 1. The initial parameter data set S1 is usable exclusively for loading an individual subscriber identification IMSI into the subscriber identity module 1. By means of retrieving an individual subscriber identification IMSI into the subscriber identity module 1 based on an initial parameter data set S1 a preliminary parameter data set S2 is arranged in the subscriber identity module 1.

A preliminary parameter data set S2 in the context of the invention comprises an individual subscriber identification IMSI and a non-individual secret key Ki-G. The preliminary parameter data set S2 is usable exclusively for loading an individual secret key Ki into the subscriber identity module 1 using the individual subscriber identification IMSI. By means of retrieving an individual secret key Ki into the subscriber identity module 1, based on a preliminary parameter data set S2, a final parameter data set S3 is arranged in the subscriber identity module 1.

A final parameter data set S3 in the context of the invention comprises an individual subscriber identification IMSI and an individual secret key Ki. Only a final parameter data set S3 enables a regular, permanent operation of a mobile radio end device having the subscriber identity module 1 in mobile radio networks, for example to make telephone calls, call up websites on the Internet via the mobile radio interface, or transmit data on a mobile basis.

FIGS. 3(a) to 3(c) show authentication cycles 3(a), 3(b) and 3(c) for the purpose of 3(a) retrieving an individual IMSI, 3(b) retrieving an individual secret key and 3(c) normal operation in the mobile radio network, by means of authentication messages formed with parameter data sets according to FIG. 2, according to embodiments of the invention. The objective of exchanging the first two authentication messages N(S1), N(S2) or authentication cycles 3(a), 3(b) is to personalize the subscriber identity module 1 with two separate authentication cycles 3(a) (retrieval of an individual IMSI) and 3(b) (retrieval of an individual secret key Ki). The objective of exchanging the third authentication message is the authentication during normal operation of the subscriber identity module 1 in the mobile radio network.

According to FIG. 3(a), a still completely unpersonalized subscriber identity module 1 includes an initial parameter data set S1 comprising a non-individual, non-unique initial subscriber identification IMSI-G (e.g. a group IMSI) identical for a multiplicity of subscriber identity modules and a non-individual, non-unique preliminary secret key Ki-G (e.g. a group secret key) identical for a multiplicity of subscriber identity modules. If a completely unpersonalized subscriber identity module 1 according to FIG. 3(a) sends an authentication message N(S1) to a mobile radio server 2, the authentication message N(S1) is formed with an initial parameter data set S1.

The mobile radio server 2 verifies the authentication message N(S1) and sends, after carrying out all the prescribed steps, an individual subscriber identification IMSI to the subscriber identity module 1. The individual subscriber identification IMSI is programmed into the subscriber identity module 1.

Now the subscriber identity module 1 is in the state of FIG. 3(b) and includes a preliminary parameter data set S2 comprising an individual subscriber identification IMSI and a non-individual, non-unique preliminary secret key Ki-G.

If a subscriber identity module 1 arranged according to FIG. 3(b) sends an authentication message N(S2) to a mobile radio server 2, the authentication message N(S2) is formed with the preliminary parameter data set S2. The mobile radio server 2 verifies the authentication message N(S2) and sends, after carrying out all the prescribed steps, an individual secret key Ki to the subscriber identity module 1. The individual secret key Ki is programmed into the subscriber identity module 1.

Now the subscriber identity module 1 is in the state of FIG. 3(c) and includes a final parameter data set S3 comprising an individual subscriber identification IMSI and an individual, unique final secret key Ki. The subscriber identity module 1 is now arranged for permanent operation in the mobile radio network. Authentication messages are now created and sent with the final parameter data set S3, with the individual subscriber identification IMSI and the individual, unique final secret key Ki.

According to FIGS. 4(b1) and 4(b2), the retrieval of the secret key Ki, based on a preliminary parameter data set S2 which comprises an individual subscriber identification IMSI not yet registered with the mobile radio server 2 and a non-individual preliminary secret key Ki-G, may comprise, according to embodiments of the invention, two separate authentication steps 4(b1) (registration of the at first still unknown individual IMSI) and 4(b2) (retrieval of the individual secret key Ki). The authentication cycle (b1)+(b2) represented in FIGS. 4(b1) and 4(b2) for retrieving the secret key Ki is analogous to the authentication cycle shown in FIG. 3(b). According to FIG. 4(b1), the subscriber identity module 1 sends to a mobile radio server 2 an authentication message N(S2) which was formed with the individual subscriber identification IMSI not yet registered with the mobile radio server 2 and the non-individual preliminary secret key Ki-G (i.e. with a preliminary parameter data set S2). In response to the receipt of the authentication message N(S2), the mobile radio server 2 ascertains that the subscriber identification IMSI is unknown. The mobile radio server 2 further verifies the non-individual preliminary secret key Ki-G. If the non-individual preliminary secret key Ki-G is verified to be positive, it is recognized by the mobile radio server 2 as a preliminary secret key Ki-G authorized by the mobile radio server. In response to the positive verification of the preliminary secret key Ki-G, the subscriber identification IMSI is registered with the mobile radio server 2 as a subscriber identification IMSI known from now on and the subscriber identification IMSI is informed about this (acknowledgement "OK").

In a subsequent step the subscriber identity module 1 sends to the mobile radio server 2 a further authentication message N(S2) which was formed with the individual subscriber identification IMSI in the meantime registered with the mobile radio server 2 and the non-individual preliminary secret key Ki-G (i.e. with a registered preliminary parameter data set S2). In response to the receipt of the further authentication message N(S2), the mobile radio server 2 ascertains that the subscriber identification IMSI is already registered. The mobile radio server 2 further verifies the non-individual preliminary secret key Ki-G. If the non-individual preliminary secret key Ki-G is verified to be positive, it is recognized by the mobile radio server 2 as a preliminary secret key Ki-G authorized by the mobile radio server. In response to the positive verification of the preliminary secret key Ki-G, the mobile radio server 2 sends the final secret key Ki to the subscriber identity module 1. Moreover, the final secret key Ki is registered together with the already registered subscriber identification IMSI with the mobile radio server 2, with the result that now a final parameter data set comprising a final subscriber identification IMSI and a final secret key Ki is registered with the mobile radio server 2 for the subscriber identity module 1.

FIG. 5 shows by way of example a plurality of preliminary secret keys Ki-G1, Ki-G2, Ki-G3, . . . for several groups 1, 2, 3, . . . of subscriber identity modules 1. Each subscriber identification IMSI or IMSI-G has an addition from which it can be seen to which group an IMSI belongs. For example, non-individual group subscriber identification 1-IMSI-G and individual single subscriber identification 1-IMSI belong to group 1 with group secret key Ki-G1. 2-IMSI-G and 2-IMSI belong to group 2 with group secret key Ki-G2. 3-IMSI-G and 3-IMSI belong to group 3 with group secret key Ki-G3.

The invention claimed is:

1. A method for the initial operation and personalization of a subscriber identity module in a mobile radio network, in which, prior to its first initial operation in the mobile radio network, the subscriber identity module does not yet include an individual, unique parameter data set comprising at least an individual subscriber identification and an individual secret key and is being equipped with an individual, unique parameter data set only after or on the occasion of its first initial operation in the mobile radio network,
characterized by the steps of:
a) supplying a subscriber identity module which includes a preliminary parameter data set comprising:
a1) a unique subscriber identification individual to the subscriber identity module, and
a2) a non-individual, non-unique preliminary secret key identical for a multiplicity of subscriber identity modules;
b) supplying a mobile radio server which has the non-individual, non-unique preliminary secret key, and, at the mobile radio server, performing the steps of:
b1) taking on, from the subscriber identity module, an authentication message formed with the individual, unique subscriber identification and the non-individual, non-unique preliminary secret key;
b2) in response to taking on the authentication message, verifying the authentication message according to predetermined criteria, and in the case of a successful authentication, sending an individual, unique final secret key to the subscriber identity module for programming into the subscriber identity module.

2. The method according to claim 1, further comprising the steps of:
before step a):
c) supplying a subscriber identity module which includes an initial parameter data set including:
c1) a non-individual, non-unique initial subscriber identification identical for a multiplicity of subscriber identity modules, and
c2) the non-individual, non-unique preliminary secret key identical for a multiplicity of subscriber identity modules;
d) at the mobile radio server:
d1) taking on, from the subscriber identity module, an initial authentication message formed with the non-individual, non-unique initial subscriber identification and the non-individual, non-unique preliminary secret key;
d2) in response to taking on the initial authentication message, verifying the initial authentication message according to predetermined criteria, and in the case of a successful authentication, sending the unique subscriber identification individual to the subscriber identity module according to a1) to the subscriber identity module for programming into the subscriber identity module;
d3) programming the individual, unique subscriber identification a1) into the subscriber identity module and thus arranging the preliminary parameter data set according to a) in the subscriber identity module.

3. The method for preparing a subscriber identity module for a method according to claim 1, the method for preparing comprising the steps of:
c) supplying a subscriber identity module which includes an initial parameter data set including:
c1) a non-individual, non-unique initial subscriber identification identical for a multiplicity of subscriber identity modules, and
c2) a non-individual, non-unique preliminary secret key identical for a multiplicity of subscriber identity modules;
d) at a mobile radio server:
d1) taking on, from the subscriber identity module, an initial authentication message formed with the non-individual, non-unique initial subscriber identification and the non-individual, non-unique preliminary secret key;
d2) in response to taking on the initial authentication message, verifying the initial authentication message according to predetermined criteria, and in the case of a successful authentication, sending a unique subscriber identification individual to the subscriber identity module to the subscriber identity module for programming into the subscriber identity module;

d3) programming the individual, unique subscriber identification into the subscriber identity module, and therefore arranging a preliminary parameter data set in the subscriber identity module, characterized by the further step of:

e) combining, at least in the subscriber identity module the individual, unique subscriber identification and the non-individual, non-unique preliminary secret key into a preliminary parameter data set which is arranged to cause, in a subsequent step, a sending of an individual, unique final secret key to the subscriber identity module for programming into the subscriber identity module.

4. The method according to claim 1, further comprising the step of:

b3) programming the individual, unique final secret key into the subscriber identity module to equip the subscriber identity module with the individual, unique parameter data set.

5. The method according to claim 1, wherein the preliminary parameter data set according to a)

enables only one single authentication operation with the subscriber identity module by means of an authentication message; or/and enables merely the sending of the individual, unique final secret key to the subscriber identity module, but not a multiple or permanent utilization of the subscriber identity module for sending authentication messages.

6. The method according to claim 1, following the steps of receiving according to b1 or d1 and positively verifying according to b2 or d2, further comprising:

at the mobile radio server: registering the unique subscriber identification individual to the subscriber identity module as the final unique subscriber identification associated with the subscriber identity module.

7. The method according to claim 1, wherein several groups of subscriber identity modules are supplied, each group comprising a multiplicity of subscriber identity modules, wherein the preliminary parameter data set a) includes as the preliminary secret key a preliminary group key from a plurality of group keys, wherein each group has assigned thereto an own group key from the plurality of group keys, wherein the mobile radio server has all the group keys from the plurality of group keys, and wherein the individual, unique subscriber identification according to a1) and, where applicable, the identical, non-individual, non-unique initial subscriber identification according to c1) includes a group key information item from which it can be derived with which group key the subscriber identification is associated.

8. The method according to claim 1, wherein the step b2) of verifying the authentication message according to predetermined criteria comprises the following sub steps performed at the mobile radio server:

b2-1) extracting the non-individual, non-unique preliminary secret key from the authentication message;

b2-2) verifying the non-individual, non-unique preliminary secret key extracted according to b2-1).

9. The method according to a claim 8, further comprising the step of:

b2-3) in case that in step b2-2) the extracted non-individual, non-unique preliminary secret key is verified to be positive, evaluating the subscriber identification according to feature a1) as a valid subscriber identification, b3-4) registering the subscriber identification evaluated as valid according to step b2-3) with the mobile radio server as a valid subscriber identification.

10. The method according to claim 9, wherein step b2) further comprises the steps performed at the mobile radio server:

b2-4) after the step b3) of registering the subscriber identification evaluated to be valid with the mobile radio server: taking on, from the subscriber identity module, a second authentication message formed with the individual, unique subscriber identification and the non-individual, non-unique preliminary secret key, b2-5) in response to taking on the second authentication message, verifying the second authentication message according to predetermined criteria, and in the case of a successful authentication, sending the individual, unique final secret key to the subscriber identity module for programming into the subscriber identity module.

11. The method according to claim 10, wherein the step b2-5) of verifying the second authentication message according to predetermined criteria comprises the following substeps performed at the mobile radio server:

b2-5-1) extracting the non-individual, non-unique preliminary secret key from the second authentication message;

b2-5-2) verifying the non-individual, non-unique preliminary secret key extracted according to b2-5-1);

b2-5-3) in case that in step b2-5-2) the extracted non-individual, non-unique preliminary secret key is verified to be positive, sending the individual, unique final secret key to the subscriber identity module for programming into the subscriber identity module.

12. The method according to claim 1, further comprising the step of:

registering, with the mobile radio server, the individual, unique final secret key as the individual, unique final secret key associated with the subscriber identity module.

13. The method according to claim 1, wherein the mobile radio server is arranged to perform the verification of the authentication message according to step b2) for each individual, unique subscriber identification taken on in an authentication message according to step b1), in particular without a requirement that the individual, unique subscriber identification is already registered with the mobile radio server.

14. The method according to claim 8, wherein the authentication according to step b2-2) or according to b2-5-2) is performed by means of a challenge-response method.

* * * * *